May 31, 1966     C. B. STOKER, JR     3,253,708

DISPLAY PACKAGE

Filed May 14, 1964     2 Sheets-Sheet 1

INVENTOR.
CARL B. STOKER, JR.
BY
J.B. Holden
ATTORNEY

May 31, 1966  C. B. STOKER, JR  3,253,708
DISPLAY PACKAGE

Filed May 14, 1964  2 Sheets-Sheet 2

INVENTOR.
CARL B. STOKER, JR.
BY
J. B. Holden
ATTORNEY

United States Patent Office 3,253,708
Patented May 31, 1966

3,253,708
DISPLAY PACKAGE
Carl B. Stoker, Jr., Akron, Ohio, assignor to The Goodyear Tire & Rubber Company, Akron, Ohio, a corporation of Ohio
Filed May 14, 1964, Ser. No. 367,327
5 Claims. (Cl. 206—80)

The invention relates to a new package and its preparation.

The package may be called a "see-through skin package" and is designed primarily for packaging bottled goods, such as cosmetics, flavorings, perfumes, etc., but may also be used for packaging any solid object or a plurality of objects such as a bar of soap, a package of razor blades, several bottles, etc. The package provides a distinct advance over the present skin packages, because the entire surface of the packaged item is visible. The item is located in an opening in a stiff member (usually called a board) and held tight between two transparent films, one of which (referred to herein as the front film) is shaped around the item so that the item is suspended in the opening, away from its edges. The other film (the back film) may be sealed to the back of the board only, or it may be sealed to the back side of a portion of the front film which is within the opening in the board, or, as a third alternative, part of the back film is sealed to the back of the board and another part is sealed to the back of the front film which is within the opening in the board.

In preparing the package, the board which is air pervious, as is essential for boards used in any skin packages, has one surface (referred to herein as the top surface) of such a composition that the front film used in making the package will adhere to it when heated, which also is essential for any skin packages. The board may be coated for this purpose or the board and film may be of such compositions that they adhere to one another at elevated temperatures. The back film is usually smaller in area than the board. It covers most or all of the bottom of the opening in the board and may cover part of the back of the board. It does not cover the whole of the back of the board because this would prevent sucking the front film down over the item by vacuum applied to the back of the board. It is advantageous to prevent a portion of this back film from being adhered to either the board or the front film to serve as a means for separating the back film from the board, or for tearing the two films apart, to gain access to the packaged item.

If the back film is to be adhered to all or a part of the back of the board, it is generally desirable to have it pre-assembled to the board. This assembly is placed on the perforated support of a skin-packaging machine. The item to be packaged is placed in the opening, on the back film. The front film is then placed over the item and the board. This film is clamped around its edge, heated and then stretched down around the item by vacuum and adhered to the board.

If the back film is smaller than the opening, or if it is not adhered to the back of the board, this film is first placed on the perforated support of the machine, the backing is placed on this and the item is placed in the opening, and then the front film is put over this and the vacuum and heat are applied.

The invention is further described in connection with the accompanying drawings, in which FIGURE 1 is a plan view of the board showing an opening;

In preparing the package the board 4 is provided with an opening 5 which is somewhat larger than the bottle or other item which is to be packaged. This board is of the type usually employed in skin packaging. It may be perforated with fine pinhole openings 6, as shown, and the board structure itself is porous so that when vacuum is applied under the board air is sucked through the pinhole openings and also through the board from all edges, including the edge of the opening 5.

Figure 1:
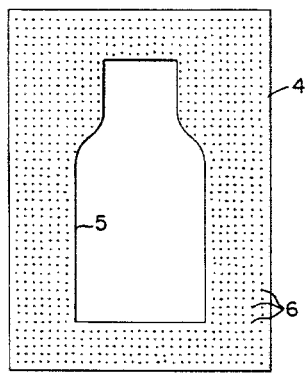
Figure 2:
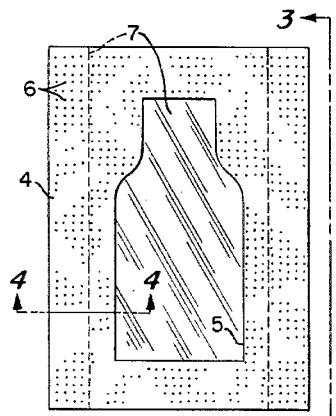
FIGURE 2 is a plan view of the pre-assembled board and back film.
Figure 3:
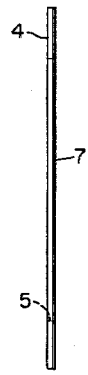
FIGURE 3 is an edge view on the line 3—3 of FIGURE 2.
Figure 5:
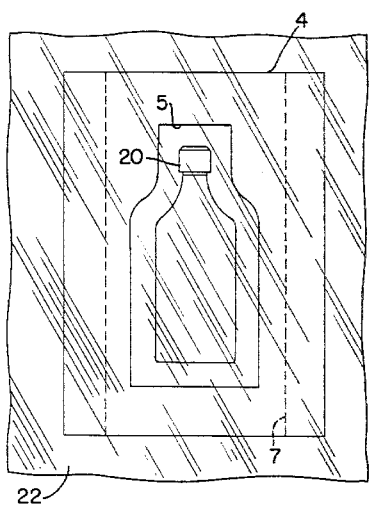
FIGURE 5 is a plan view of the film covering the item in the opening before applying suction.
Figure 4:
FIGURE 4 is an enlarged section on the line 4—4 of FIGURE 2.

A small film 7 shown in dotted lines in FIGURE 2 is adhered to the back of the board over the opening. It may extend to the edges of the board as shown in FIGURE 2, but this is not necessary.

The front of the board is of such a composition that it will adhere to the front film when this film is heated and sucked to the front of the board. A coating may be applied to the front of the board to make it adhesive, and a film coating may be used. However, certain films adhere to the board composition, and in that case a coating is not necessary.

Figure 6:
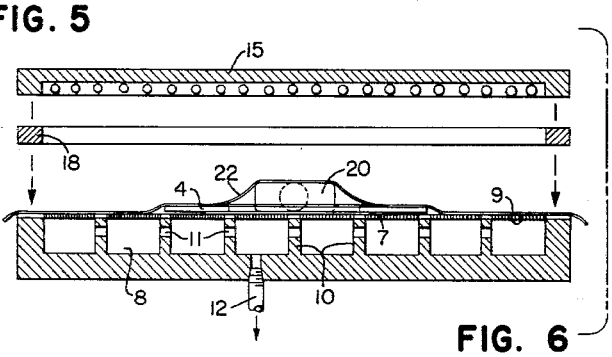
FIGURE 6 is a section through the vacuumizing equipment with the parts of the package in place.

Any usual type of skin-packaging equipment may be used for carrying out the process. That shown in FIGURE 6 includes a vacuum cavity 8 which usually is covered with a perforated plate 9 supported at intervals by the partitions 10 which include openings 11 so that when a vacuum is drawn through the pipe 12 the entire chamber is vacuumized. The heater 15 may be a radiant heater or it may be any suitable type of heater and, if necessary, may be lowered toward the film to heat it up. Clamp 18 is provided to clamp the edge of the film to the vacuum chamber during vacuumizing. The board 4 with the back film 7 on it is placed on the porous plate 9. The bottle 20 or other item to be packaged is placed in the opening and rests on the back film. The whole of the surface of the plate 9 is then covered with the front film 22. The operation is carried on most economically on a vacuum plate which is not much larger than the board. Templates may be used to cover any unused portion of plate 9. The film should cover all of the plate 9 in order to draw a satisfactory vacuum.

When the film 22 is in place the clamp 18 clamps the edge tight against the plate 9 so that when vacuum is applied all of the plate 9 is covered by the film. Of course in the center of the plate the elements of the package are between the film and the plate 9.

With the film clamped in place heat is supplied by lowering the heater 15, if necessary. The film is heated to a temperature at which it is sufficiently soft to be stretchable. The temperatures required for stretching the various films that are on the market are well known and employed in ordinary skin-packaging operations.

Figure 7:
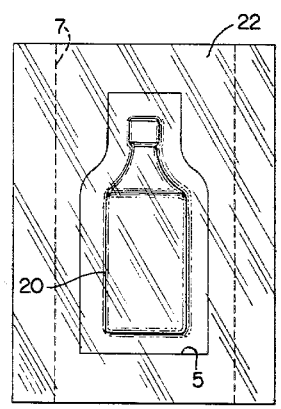
FIGURE 7 is a plan view of the completed package.
Figure 8:
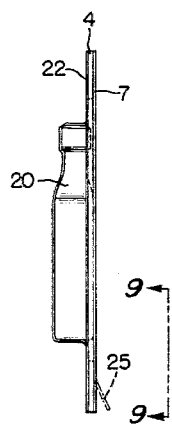
FIGURE 8 is a side view of the same.
Figure 9:
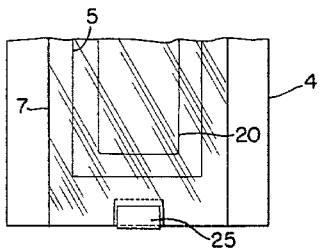
FIGURE 9 is a plan view of a part of the back of the completed package.

When the film has been heated to the desired temperature a vacuum is drawn through the line 12. The board 4 is perforated and the plate 9 is porous so that the entire area of the film 22 is drawn down by the vacuum. The film is flat and is stretched down over the item 20. It is not necessary that vacuum be drawn through all of the board perforations 6, and some of these are covered by the back film 7. This board is porous and all the air is sucked out of it regardless of the fact that the back film 7 covers a part of the bottom surface, and the area above the board under the film and all of the space under the film which surrounds the bottle is evacuated and the film is drawn tight against the bottle and stretched over it. Then the vacuum is released, the package is lifted from the vacuumizing chamber and the excess film 22 is usually trimmed away from around the edges of the board 4. FIGURES 7 and 8 are a plan and side view of the finished package.

It is desirable to provide a portion 25 at the edge of the back film 7 which is not adhered to the board and is thus easily grasped to facilitate opening the package. Thus an unadhered portion may be in the nature of a tab. If it is necessary to apply adhesive to the board in order to make the back film stick to it, the space under the portion 25 may be kept free of adhesive. The whole back of the board may be covered with adhesive and this area under the portion 25 may be covered with talc or the like to prevent adhesion. Many means are available for preventing adhesion of this portion to the board. When it comes time to open the package it is only necessary to lift the portion 25 and pull on it, thus tearing the film away from the back of the board.

The completed package is pilfer-resistant. It affords complete visibility of the item which is packaged so that instructions on the back may be read as well as those on the front, and it is also possible to read instructions on the sides. The package presents a novel appearance in that the item appears to be suspended in mid-air within the opening. Although the front film usually covers the whole of the top of the board, this is not necessary. The back film shown in the drawings is larger than necessary. If the board covers all of the porous plate 9 the film need not extend beyond the edges of the board, and this minimizes the amount of film employed.

Packages formed as illustrated in the foregoing figures are no more gas- and moisture-resistant than the backing. If an imperforate backing is used, such a package may be quite impervious to both gas and moisture. If the perforated porus type of backing is employed the packages will not be very tight.

Figure 10:
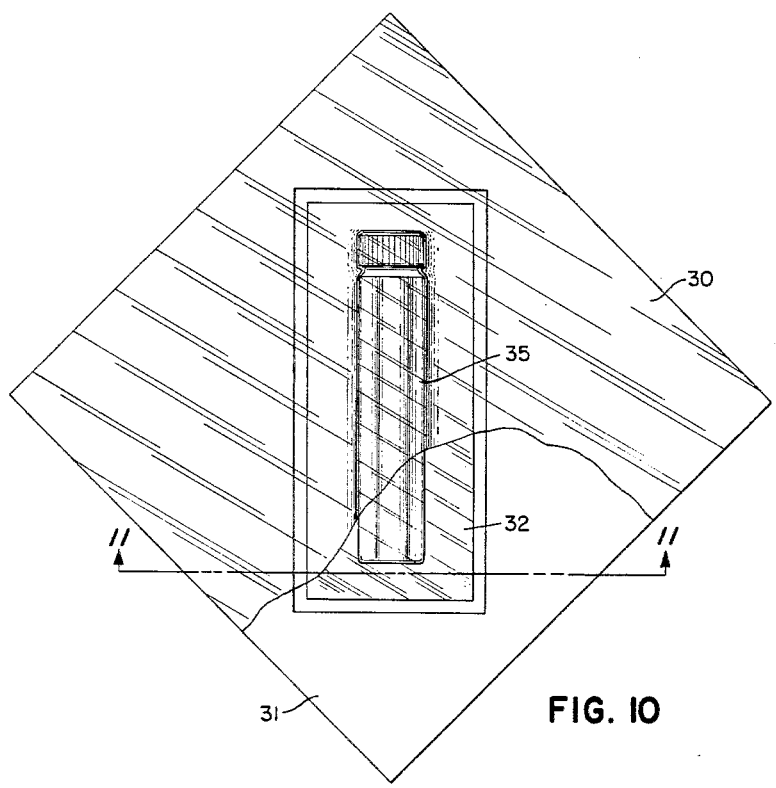
FIGURE 10 is a plan view of a modified package in which the front and back films are sealed together around the bottle packaged between them making the enclosure as gas- and moisture-tight as the films.
Figure 11:
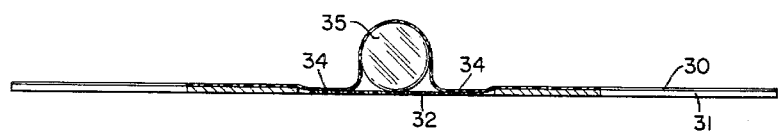
FIGURE 11 is a section on the line 11—11 of FIGURE 10.

The front film 30 of the package illustrated in FIGURES 10 and 11 is adhered to the whole of the porous backing 31. The back film 32 is heat-sealed at 34 to the front film 30 around the perimeter of the bottle 35 that is being packaged. This makes the enclosure which contains the bottle as gas- and moisture-impervious as the film itself. Therefore, the top may be placed on the bottle without a sealing band. In forming the package, as the space in the opening under the front film is evacuated, the front film is drawn into sealing contact with the back film. One or both films may carry printing. They need not be of the same composition. Items other than a bottle may be packaged in this manner.

Figure 12:
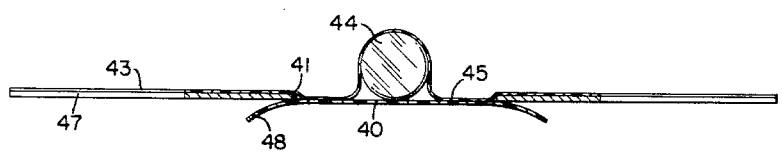
FIGURE 12 is a view similar to that shown in FIGURE 11 but with the back film larger than the opening.

In the somewhat modified package shown in FIGURE 12, the back film 40 is larger than the opening 41. It is heat-sealed to the front film 43 around the entire perimeter of the bottle 44. This package differs from the package of FIGURE 11 in that the back film which is heat-sealed to the front film at 45, does not heat-seal to the back of the board 47 but underlies it at 48 at at least one edge of the opening, providing a loose edge of the back film which may be used to tear the package open. This edge 48 of the back film may be small in area to serve as a tab, or it may surrender the entire opening as shown in FIGURE 12. In forming the package, when the vacuum is drawn the opening is evacuated through the porous board through the edge of the opening.

The invention is covered in the claims which follow.

What I claim is:

1. A skin package including (1) a stiff air-pervious member with an opening in it and a heat-sealable front surface, (2) an item substantially smaller than the opening and to be packaged inside the opening, (3) a transparent back film in a plane adjacent the back of the board and adhered to only a limited area of the back of the board which is around the opening, the packaged item being thicker than the board, and (4) a transparent front film stretched down over the edges of the item and heat-sealed flat against the front of the board around the opening, the films being sealed together around the item within the opening.

2. The package of claim 1 in which a stoppered bottle is packaged.

3. The package of claim 1 in which a closed container is packaged.

4. The method of packaging an item in an opening in a porous board which comprises arranging the item in the opening between a transparent front film which is heat-sealable to the front of the board and which covers the opening and a transparent back film which is smaller than the area of the board and is sealed to a part of the back of the board around the opening, drawing a vacuum through the board from the back thereof, around the back film, and while applying heat, stretching the front film over the item and adhering it by heat to the front of the board and to the back film around the item, within the opening.

5. The method of producing a package which comprises providing an air-pervious board with an opening in it and a back film covering only a part of the board on the back thereof and sealed to the board around the opening, and then with this located on a porous plate of a skin-packaging machine with the back film adjacent the plate, placing the item to be packaged on the surface of the back film exposed in the opening, covering the item and the board with a top film, clamping this film over the item and the board, heating the top film to soften it, and then sucking a vacuum through the board, around the back film, to vacuumize the space under the top film which is around the item and stretching the top film over the item to be packaged and sealing it to the adjacent surface of the board and to the back film around the item within the opening.

References Cited by the Examiner

UNITED STATES PATENTS

| | | | |
|---|---|---|---|
| 2,861,405 | 11/1958 | Hanford. | |
| 3,173,540 | 3/1965 | Lapides | 206—78 |
| 3,185,295 | 5/1965 | Crane | 206—78 |

THERON E. CONDON, *Primary Examiner.*

W. T. DIXSON, *Assistant Examiner.*